US012132965B2

(12) United States Patent
Dureau et al.

(10) Patent No.: US 12,132,965 B2
(45) Date of Patent: *Oct. 29, 2024

(54) TELEVISION RELATED SEARCHING (71) Applicant: Google LLC, Mountain View, CA (US)

(72) Inventors: Vincent Dureau, Palo Alto, CA (US); Salahuddin Choudhary, Palo Alto, CA (US); Benjamin Ling, San Francisco, CA (US); Shalini Pai, Saratoga, CA (US); Dennis Miloseski, San Francisco, CA (US); Justin Koh, Mountain View, CA (US); Richard William Bragg, Los Altos, CA (US); Alok Chandel, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,455

(22) Filed: Sep. 11, 2023

(65) Prior Publication Data
US 2023/0421858 A1 Dec. 28, 2023

Related U.S. Application Data (63) Continuation of application No. 17/892,482, filed on Aug. 22, 2022, now Pat. No. 11,758,237, which is a
(Continued)

(51) Int. Cl.
*H04N 21/482* (2011.01)
*G06F 16/48* (2019.01)
(Continued)

(52) U.S. Cl.
CPC ......... *H04N 21/4826* (2013.01); *G06F 16/48* (2019.01); *G06F 16/78* (2019.01); *H04N 21/4622* (2013.01); *H04N 21/4828* (2013.01)

(58) Field of Classification Search
CPC .......... H04N 21/4826; H04N 21/4622; H04N 21/4828; G06F 16/48; G06F 16/78
See application file for complete search history.

(56) References Cited

U.S. PATENT DOCUMENTS 6,240,555 B1 5/2001 Shoff et al.
6,370,543 B2 4/2002 Hoffert et al.
(Continued)

FOREIGN PATENT DOCUMENTS

KR 20030062585 9/2005
KR 20090123245 12/2009
WO WO 2007004371 1/2007

OTHER PUBLICATIONS

Gigaom.com, "Samsung See-N-Search: When New & Old TeeVees Come Together", pp. 1-7, available at: http://gigaom.com/video/samsung-see-n-search-when-old-tee-vees-come-together, last accessed May 9, 2011.

(Continued)

*Primary Examiner* — John R Schnurr
(74) *Attorney, Agent, or Firm* — Brake Hughes Bellermann LLP (57) ABSTRACT

The subject matter of this specification can be implemented in, among other things, a computer-implemented method that includes identifying metadata related to television programming being presented on a display device. The method further includes extracting one or more keywords from the metadata. The method further includes generating multiple search suggestions based on the keywords and first search results based on one or more of the search suggestions. The method further includes presenting the search suggestions and the first search results together on the display device.

20 Claims, 6 Drawing Sheets

Related U.S. Application Data continuation of application No. 17/240,189, filed on Apr. 26, 2021, now Pat. No. 11,425,468, which is a continuation of application No. 16/841,096, filed on Apr. 6, 2020, now Pat. No. 10,992,996, which is a continuation of application No. 16/241,183, filed on Jan. 7, 2019, now Pat. No. 10,616,658, which is a continuation of application No. 15/795,900, filed on Oct. 27, 2017, now Pat. No. 10,178,438, which is a continuation of application No. 13/104,662, filed on May 10, 2011, now Pat. No. 9,807,464.

(60) Provisional application No. 61/346,457, filed on May 19, 2010.

(51) Int. Cl.
   *G06F 16/78* (2019.01)
   *H04N 21/462* (2011.01)

(56) References Cited

U.S. PATENT DOCUMENTS

| | | |
|---|---|---|
| 8,132,118 B2 | 3/2012 | Danker et al. |
| 8,255,280 B1 | 8/2012 | Kay et al. |
| 8,763,024 B2 | 6/2014 | White et al. |
| 9,037,984 B2 | 5/2015 | Park et al. |
| 11,425,468 B2 | 8/2022 | Dureau et al. |
| 11,758,237 B2 * | 9/2023 | Dureau .............. H04N 21/4622 725/38 |
| 2002/0147984 A1 | 10/2002 | Tomsen et al. |
| 2006/0031833 A1 | 2/2006 | Huang et al. |
| 2006/0167896 A1 | 7/2006 | Kapur et al. |
| 2006/0287985 A1 | 12/2006 | Castro et al. |
| 2007/0214488 A1 | 9/2007 | Nguyen et al. |
| 2008/0183698 A1 | 7/2008 | Messer et al. |
| 2008/0244681 A1 | 10/2008 | Gossweiler et al. |
| 2010/0162164 A1 | 6/2010 | Kwon et al. |
| 2010/0242077 A1 | 9/2010 | Kota et al. |
| 2013/0145395 A1 | 6/2013 | Jeong et al. |

OTHER PUBLICATIONS

International Search Report and Written Opinion dated Feb. 9, 2012 in International Patent Application No. PCT/US2011/035793.
Notice of Allowance dated Apr. 12, 2022 in U.S. Appl. No. 17/240,189.
Notice of Allowance dated May 1, 2023 in U.S. Appl. No. 17/892,482.
Notice of Allowance dated Jun. 30, 2017 in U.S. Appl. No. 13/104,662.
Notice of Allowance dated Aug. 31, 2018 in U.S. Appl. No. 15/795,900.
Notice of Allowance dated Nov. 26, 2019 in U.S. Appl. No. 16/271,183.
Notice of Allowance dated Dec. 30, 2020 in U.S. Appl. No. 16/841,096.
Office Action dated Jan. 13, 2023 in U.S. Appl. No. 17/892,482.
Office Action dated Jan. 22, 2013 in U.S. Appl. No. 13/104,662.
Office Action dated Mar. 1, 2017 in U.S. Appl. No. 13/104,662.
Office Action dated Apr. 10, 2018 in U.S. Appl. No. 15/795,900.
Office Action dated May 25, 2016 in U.S. Appl. No. 13/104,662.
Office Action dated Aug. 6, 2019 in U.S. Appl. No. 16/241,183.
Office Action dated Oct. 5, 2012 in U.S. Appl. No. 13/104,662.
Office Action dated Oct. 21, 2020 in U.S. Appl. No. 16/841,09.
Office Action dated Nov. 8, 2016 in U.S. Appl. No. 13/104,662.
Office Action dated Dec. 3, 2021 in U.S. Appl. No. 17/240,189.
OpenTV Inc., "OpenTV H20 1.2 Technical White Paper", 2004, pp. 1-14.
OpenTV, Inc., "OpenTV Notify Technical White Paper", 2004, pp. 1-16.
OpenTV.com, "OpenTV Account 1.3", pp. 1-2, available at: http://opentv.com/products/servicemgmt.htm, last accessed Oct. 13, 2009.
OpenTV.com, "OpenTV H20 1.0 Product Sheet", pp. 1-4, available at: http://opentv.com/products/servicemgmt.htm, last accessed Oct. 13, 2009.
OpenTV.com, "OpenTV Streamer", pp. 1-2, available at: http://opentv.com/products/servicemgmt.htm, last accessed Oct. 13, 2009.

* cited by examiner

TELEVISION RELATED SEARCHING

CROSS-REFERENCE TO RELATED APPLICATIONS

This application is a continuation of U.S. patent application Ser. No. 17/892,482, filed Aug. 22, 2022, which is a continuation of U.S. patent application Ser. No. 17/240,189, filed Apr. 26, 2021, which is a continuation of U.S. patent application Ser. No. 16/841,096, filed Apr. 6, 2020, which is a continuation of U.S. patent application Ser. No. 16/241,183, filed Jan. 7, 2019, which is a continuation of U.S. patent application Ser. No. 15/795,900, filed Oct. 27, 2017, which is a continuation of U.S. patent application Ser. No. 13/104,662, filed May 10, 2011, which claims the benefit of U.S. Provisional Patent Application No. 61/346,457, filed May 19, 2010, each of which is incorporated by reference herein in its entirety.

TECHNICAL FIELD

This instant specification relates to television related searching.

BACKGROUND

Many people like to multi-task while watching television. In some cases, a person may like to surf the web or chat with friends while watching television. In some cases, a person may play a game while watching television. These activities sometimes draw viewers away from television to their personal computer, cell phone, game console, or other network connected device.

Sometimes, computer users perform searches for content that is available on the Internet. For example, a user may browse to a web site for a search engine. At the search engine web site, the user enters a search query. The search query generally includes words, phrases, or operators that describe what the user is looking for. The search engine processes the search query and returns a set of search results to the user. The search results generally include links to web pages or other content available on the Internet that match one or more terms in the search query. The user can then select a link in the search results to navigate to the corresponding web page.

Some enhanced television systems, such as WINK, OPENTV, ADVANCED TELEVISION ENHANCEMENT FORUM (ATVEF), YAHOO WIDGETS, and OPEN-CABLE APPLICATION PLATFORM (OCAP), can display Internet content on top of television content. In some cases these systems use triggers built into the audio/video signal to link particular television shows or advertisements with a specific interactive application. These systems can associate an application with a particular point of a particular program.

SUMMARY

In general, this document describes television related search suggestions. In one aspect, a computer-implemented method for television related searching includes identifying metadata related to television programming being presented on a display device. The method further includes extracting one or more keywords from the metadata. The method further includes generating multiple search suggestions based on the keywords and first search results based on one or more of the search suggestions. The method further includes presenting the search suggestions and the first search results together on the display device.

Implementations can include any, all, or none of the following features. The method including receiving a user selection of at least one of the presented search suggestions; generating second search results based on the selected search suggestion; and presenting the second search results on the display device. The search suggestions are automatically generated upon identifying the metadata or extracting the keywords. Identifying the metadata or extracting the keywords includes determining that the metadata or the keywords identify a location of additional content. The location identifies a television program, a television channel, a web page, or an application. Generating the first search results includes sending a search query that includes the one or more search suggestions to a search engine system. Generating the first search results includes searching a local data storage. The method including monitoring a channel of the television programming being presented, and wherein identifying the metadata includes retrieving electronic program guide data for the channel, current day, current time, and head end system of the television programming being presented. Identifying the metadata includes recognizing text in an audio or video signal of the television programming. The first search results include an identifier of a television program currently being broadcast, a television channel, a web page, or an application; the method further including receiving a user selection of the identifier and, in response, causing content for the selected identifier to be presented on the display device. The first search results include an identifier of a television program scheduled to be broadcast at a future time; the method further including receiving a user selection of the identifier and, in response, causing content for the selected identifier to be recorded at the future time.

In one aspect, a computer-implemented method for television related searching includes outputting television programming for presentation on a display device. The method further includes presenting a text input control on the display device. The method further includes receiving at least one user input in the text input control. The method further includes generating multiple search suggestions based on the user input and first search results based on one or more of the search suggestions. The method further includes presenting the search suggestions and the first search results together on the display device.

Implementations can include any, all, or none of the following features. The method including receiving a user selection of at least one of the presented search suggestions; generating second search results based on the selected search suggestion; and presenting the second search results on the display device. Generating the first search results includes sending a search query that includes the one or more search suggestions to a search engine system. Generating the first search results includes searching a local data storage. The first search results include an identifier of a television program currently being broadcast, a television channel, a web page, or an application; the method further including receiving a user selection of the identifier and, in response, causing content for the selected identifier to be presented on the display device. The first search results include an identifier of a television program scheduled to be broadcast at a future time; the method further including receiving a user selection of the identifier and, in response, causing content for the selected identifier to be recorded at the future time.

DETAILED DESCRIPTION

Figure 1:
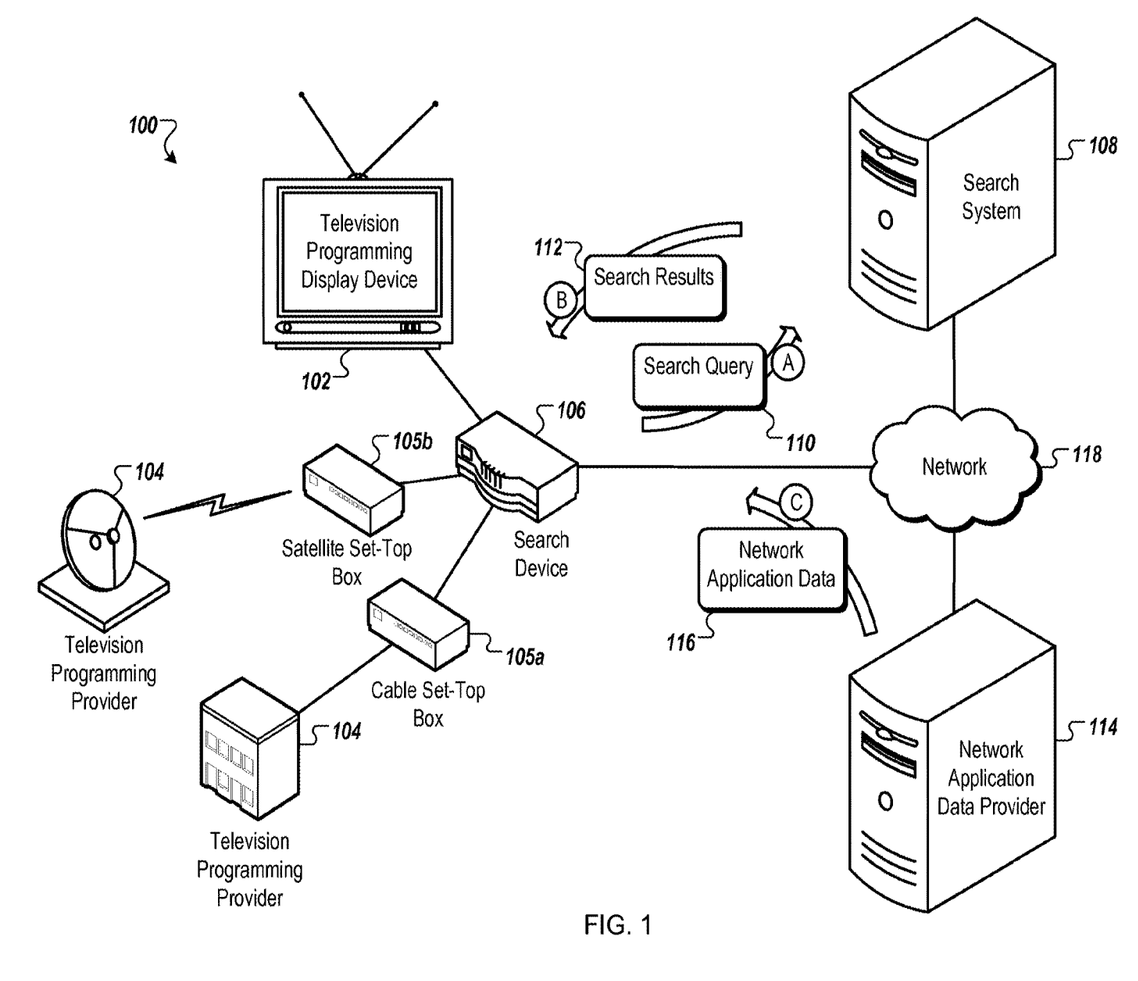
FIG. 1 is a schematic diagram that shows an example of a system for television related searching.

FIG. 1 is a schematic diagram that shows an example of a system 100 for television related searching. The system 100 is used to present television programming and additional content available from the Internet to a user. In some implementations, the additional content is related to the television programming currently being presented to the user. The additional content can include, for example, web pages, gadgets, and/or applications. Gadgets are small interactive applications written in a markup language, such as Hypertext Markup Language (HTML) or Extensible Hypertext Markup Language (XHTML). Gadgets are sometimes also referred to as widgets. In some implementations, a gadget is an iframe HTML element embedded within a container document or web page. In another implementation, a gadget can be a standalone web page. Applications are often written using a programming language, such as JAVA or OBJECTIVE C. The written programming is then compiled into an application by a compiler, either sometime prior to running the application, at runtime, or some combination of before runtime and at runtime. Often, the written programming is first compiled into bytecode, which is hardware independent. The bytecode may then be run by a virtual machine, such as the JAVA VIRTUAL MACHINE or the DALVIK VIRTUAL MACHINE.

The visual and audible output of the additional content can be shown superimposed on the television programming or, in the case of video, around the television programming. For example, visual output can be shown in the blank space that exists where the aspect ratio of television programming content does not match the aspect ratio of the display device presenting the television content. Alternatively, the display device can be split, for example, into two halves or four quarters, where the television programming and the additional content are presented in separate portions. In another example, the television programming can be presented in a thumbnail or in a corner of the display device on top of the additional content that is presented full screen or vice versa.

In some implementations, the additional content is presented on a display device that is separate from the device that presents the television programming. Whether on the same display device or a separate display device, the additional content is presented to the user while the television programming content is presented to the user. The additional content can provide a user with functionality related to the television content the user is currently viewing, such as chatting with other viewers, access to fan websites, or targeted advertising.

The system 100 includes a television programming display device 102, at least one television programming provider 104, and a search device 106. The television programming display device 102 is an electronic device used to display television programming. For example, the television programming display device 102 can be a television, computer monitor and speakers, portable video player, or smart phone.

The television programming display device 102 presents television programming provided by the television programming provider 104. The television programming can include, for example, television shows, movies, and/or commercials. The television programming provider 104 sends the television programming to the television programming display device 102 over a wire line connection, such as cable television or television provided by a telephone company, or a wireless connection, such as broadcast television or satellite television.

The search device 106 monitors the television content being displayed by the television programming display device 102 and also displays the additional content on the television programming display device 102. In some implementations, the additional content is related to the television programming currently being displayed to the user. In some implementations, the search device 106 controls the tuning of television channels and/or playback of other television programming. For example, the user can send a command to the search device 106 using a wire line or wireless input device, or a button directly on the search device 106. The command can request presentation of a specific channel, navigating up or down a channel, a particular video on demand (VOD), or playback of recorded programming. Wireless input devices can include, for example, an infrared (IR) remote control or BLUETOOTH and WIFI wireless devices, such as a smart phone, mobile computer, or a desktop computer. Wire line input devices can include, for example, a computing device connected to the search device 106 by a local area network (LAN) or the Internet. The search device 106 receives the request to change the channel and tunes in the requested channel or retrieves the requested video on demand or recorded programming.

Alternatively, the search device 106 can receive the channel change command and pass the channel change command on to an external tuner, such as through an HDMI connection to a tuner in a cable television set-top box 105a or a satellite television set-top box 105b. In another example, the search device 106 can send commands to an external tuner using a wireless connection, such as IR. In another example, the search device 106 and one or more of the set-top boxes 105a-b can communicate using a network, such as a local area network or the Internet. The search device 106 then receives the video and/or audio for the tuned-in channel from the external tuner.

In another external tuner example, the channel change commands may be sent directly to the external tuner or other external programming device, such as a digital video recorder (DVR). The search device 106 may then receive the tuned-in channel or other audio/video signal from the external tuner or programming device. The search device 106 subsequently processes the received programming to identify the metadata. In some implementations, the search device 106 can monitor a wire line or wireless connection to the external tuner/programming device to identify programming change commands sent to the external tuner/programming device. For example, the search device 106 can include an IR receiver for monitoring IR commands sent to an external device.

Whether by an internal tuner, an external tuner, programming on demand, or recorded programming, the search device 106 can decode or identify metadata for the programming. The metadata is used by the system 100 to select additional content related to the television programming being presented. The metadata may be in-band with the audio/video signal or out-of-band. For example, the search device 106 can extract in-band closed captioning text, station identification information, or television program identification information from the audio/video. In another example, metadata may be stored out of band with recorded programming, such as a file name or file attributes. In another out of band example, the search device 106 can retrieve electronic program guide (EPG) data or a transcript for a particular show, channel, and/or time slot from an internal storage at the search device 106 or an external storage, such as the set-top boxes 105*a-b* or a computing device on the same network as the search device 106 or on the Internet.

In yet another example of identifying metadata, the search device 106 or another system can perform speech recognition on the audio to identify text or image recognition on the video to recognize text or objects. For example, a system in communication with the search device 106 can store identifying information for television programming, such as a name, channel, broadcast date/time, or a portion of the audio/video. The system can also store pre-recognized transcripts of audio and/or pre-recognized text or objects for television programming. The system can compare the stored identifying information to corresponding information for the television programming being presented to the user to determine what television programming the user is currently watching. The system can then retrieve a pre-recognized transcript of the audio and/or pre-recognized text or objects from the video for the identified television programming.

The search device 106 combines an audio/video representation of the additional content with the audio/video signal for the tuned-in channel. For example, the search device 106 can overlay video for the selected additional content on top of or adjacent to the existing video for the tuned-in channel. In some implementations, the search device 106 uses a split screen to display the existing video on one side of the split and the additional content on the other. In some implementations, the search device 106 overlays audio for the additional content onto the existing audio. The search device 106 then passes the altered audio/video on to the television programming display device 102 for presentation to the user.

In the examples above, the search device 106 is a stand-alone electronic device connected to the television programming display device 102 (and in some cases an external tuner). However, in some implementations, the search device 106 can be a component incorporated within a television programming display device or an external tuner. In some implementations, whether the search device 106 is a stand-alone device or integrated within another device, as the television programming being displayed to the user changes, the search device 106 updates the additional content presented to the user.

Television programming changes can include, for example, a change in the channel, a change in the television program (e.g., the channel may remain the same, but a new television program may be presented at a particular time of day), or a change within a television program (e.g., a new guest appears on stage during a talk show television program). Updates to the additional content being presented can include, for example, presenting a new gadget, web page, list of search results and/or suggestions, or application. Updates can also include no longer presenting a previously presented gadget, web page, list of search results and/or suggestions, or application. In another example, updates can include changing the information within or provided to a gadget, web page, list of search results and/or suggestions, or application In some implementations, the search device 106 automatically creates a search query 110 using the metadata from the in band and/or out of band sources. The metadata is based on the television content being displayed on the television programming display device 102. The search query 110 can include information about the television programming, such as actors and actresses shown, programming genre, closed captioning text and/or other information. Alternatively, the search device 106 can receive the search query 110 as an input from a user. For example, the user may enter the search query 110 using a remote control or keyboard that is in communication with the search device 106. In another implementation, the user may make an input requesting that a search be performed without inputting the words or search terms to be used in the search query 110. The search device 106 may then use the metadata to generate the query.

The search device 106 sends the search query 110 to a search system 108 through a network 118, such as the Internet. In some implementations, the search device 106 can send the metadata to the search system 108. The search system 108 can then create the search query 110. In some implementations, the search system 108 creates and sends multiple proposed search queries to 106. The search device 106 presents the proposed search queries to the user and the user can select a search query to perform. The search device 106 then sends the selected search query to the search system 108.

In response to receiving the search query 110, the search system 108 performs a search of information, such as web pages, gadgets, applications, or other files, accessible over the network 118. In some implementations, the information through which the search system 108 searches can include electronic program guide information for television programming accessible by the search device 106 and/or the set-top boxes 105*a-b*. In some implementations, the search system 108 provides the results of the search to the search device 106 as search results 112. The search results 112 can include, for example, a list of television programs, channels, web pages, Internet video, or applications having attributes that match terms in the search query 110. The search results 112 can include a reference to a web page or Internet video stored at a network application data provider 114. The search system 108 can order the items in the list of the search results 112 based users' ratings of the individual items, preferences of the user associated with the search device 106, and/or viewership or number of downloads for the individual items.

Alternatively, the search system 108 can provide an item identified in the search results 112 to the search device 106. For example, the search system 108 can receive the web page or Internet video from the network application data provider 114 and forward the item to the search device 106.

In some implementations, the search system 108 receives and stores additional content available from computing devices on the network 118 prior to receiving the search query 110. This can remove an additional trip over the network 118 (to the network application data provider 114) at the time when the additional content is provided to the search device 106.

The network application data provider 114 is a computing system, such as a web server or other network accessible computing system. The network application data provider 114 stores one or more web pages, video, audio, gadgets, or applications including one or more of the items listed in the search results 112. The network application data provider 114 can send a network application data 116 over the network 118 to the search device 106. For example, the network application data provider 114 can send the network application data 116 to be processed by a gadget or application presented by the display device 102.

In addition to sending the search query 110 to the search system 108, the search device 106 can search data stored locally at the search device 106 using the search query 110. For example, the search device 106 can search within web pages, gadgets, applications, video, or files that have already been downloaded and/or installed at the search device 106. The local search results can include links for opening or initiating the existing items. The search device 106 can also search user data at the search device 106 for additional content that satisfies the search query 110. For example, the search device 106 may include bookmarks or shortcut links to web pages or other network accessible data and the search device 106 can search the bookmarks and/or shortcuts for web pages or data matching the search query 110. The search device 106 and/or the search system 108 can store a browsing history or search query history which can be searched using the search query 110. 106 can, in some implementations, display local search results immediately and displays search results from the search system 108 as they arrive at the search device 106.

In addition to sending the search query 110 to the search system 108 and searching data that is at the search device 106, additional content on the set-top boxes 105a-b can be searched. For example, one or more of the set-top boxes 105a-b can include a DVR and the search device 106 can have access to a listing of television programming and/or other content stored on the set-top boxes 105a-b. The search device 106 can then use the search query 110 to search through the recorded television programming and/or other stored content for additional content for display on the display device 102. Alternatively, the search device 106 can send the search query 110 to the set-top boxes 105a-b. The set-top boxes can then perform the search and return the search results to the search device 106. In another example, one or more of the set-top boxes 105a-b can report a listing of television programming and other content stored at the respective set-top box to an external server system. The search device 106 can then search the external server system or provide the search query to the external server system.

The search device 106 can generates new search queries when the television programming shown on the television programming display device 102 changes or when a request for searching or a search query is received from the user. For example, when the channel is changed, a different television program is presented, or when a change occurs within a television program, the search device 106 can generate a new search query. In some implementations, 106 automatically generates a search query when the search device 106 determines that the metadata for the television programming includes an explicit reference to additional content. For example, the transcript of the television programming, recognized text from audio, or recognized text from video for the television programming may indicate that an address of a web page was presented. The search device 106 can initiate a search for the address and present the web page or search results for the identified address on the display device. In another example, the search device 106 can determine that the metadata includes a reference to another television program or television channel. Accordingly, the search device 106 can initiate a search for the identified program/channel and present a list of results on the display device.

In another implementation, some processing can be performed by the search system 108. For example, the metadata can be sent to the search system 108 or another external system. The search system 108 can then analyze the metadata to determine search query suggestions and/or perform one or more searches using the search suggestions to identify search results. The search system 108 can then send the search suggestions and/or search results to the search device 106 for display on the display device 102.

In one example, a user may be watching an instructional cooking television program called "Cooking with Sparky." In this example, the television programming provider 104 is a local public broadcasting station. The television programming display device 102 in this example is a television that receives the television programming from the search device 106 through an over-the-air transmission. 106 records and stores information about the channel that is currently selected by and displayed to the user.

In some implementations, the search device 106 receives information about the specific television program that is being displayed, such as a title of the television program. For example, the search device 106 can receive electronic program guide (EPG) information from a server system over the network 118. In another example, the search device 106 can receive closed captioning (CC) information or other information within the signal or separately from the signal from the television programming provider 104 or another system. In some implementations, the EPG and CC information is retrieved from metadata in a broadcast signal, such as the metadata in the Vertical Blanking Interval or the metadata provided by the Program and System Information Protocol (PSIP). EPG metadata can include, for example, a title of the television program, a description of the television program, the channel name and/or number, and the time interval and date for the broadcast of the television program. CC metadata can include, for example, a machine generated or manual generated transcript of the television program.

In some implementations, the search device 106 can retrieve metadata for the current television program from an external source. For example, the search device 106 can use the identity of the channel and the current time and date to uniquely identify the television program. The search device 106 can then request the EPG and/or CC data from an external source, such as the search system 108 or another computing system on the network 118. Alternatively, the search device 106 can download EPG and/or CC metadata for a number of channels and television programs prior to the user selecting a channel. The search device 106 can then search for the television program in the local copy of the EPG and/or CC metadata rather than requesting the metadata at the time the user makes a selection.

Returning to the cooking show example, based on the time, date and programming information previously downloaded, the search device 106 can identify that the show being displayed is "Cooking with Sparky." The search device 106 can generate the search query 110, including terms applicable to this television program. For example, the search query 110 can include EPG information that describes the television program, such as information identifying the channel as a public broadcasting station, identifying the show as one that often features barbeque cooking, and that the show is hosted by a former stunt man named Sparky. In some implementations, the search query 110 can also include information about the user of the television programming display device 102, the hardware used to output the video, and/or other information. For example, if the viewer indicates a preference for Spanish language translations, this information can be included in the search query 110.

The search device 106 sends the search query 110 over the network 118 to the search system 108. The search system 108 performs the search query 110 on an index of web pages and other data. The search results 112 include a list of items related to the television program "Cooking with Sparky" and to properties of the user or the user's system. The search system 108 sends the search results 112 to the search device 106.

In one example, the search results 112 include a gadget or application that scans closed caption text for cooking measurements and displays their conversion values (such as from metric to standard units). In another example, the search results 112 include an advertisement for a fund raiser held by the public broadcasting station. The search results 112 may also include a gadget that shows Sparky's entry in an online encyclopedia of movies that lists the movies in which Sparky has participated as a stunt man. In another example, the search results 112 include a translator that displays the closed captioning text translated into another language.

In some implementations, the search results 112 are sent to the network application data provider 114. The network application data provider 114 can then send an item (e.g., a web page, gadget, or application) from the search results 112 to the search device 106. The search device 106 then processes the item and overlays the item on the audio/video signal passed to the television programming display device 102.

In some implementations, the television programming display device 102 can be a personal computer. For example, the television programming provider 104 can be an Internet website operated by a national broadcasting company that streams episodes of television shows. In this example, the search device 106 can be implemented as software and/or hardware in the personal computer. The viewer may be watching last week's episode of "Who Knows how to Cook?," which is a reality television show where contestants battle in a culinary tournament to win a restaurant. The search device 106 generates the search query 110 based on metadata about the show. The search query 110 includes information identifying the show as a reality television show, that the current episode features barbeque cooking, and that the show is hosted by famous restaurateur Chef Emanuel. The search device 106 sends the search query 110 to the search system 108. The search system 108 processes the search query 110 to identify a list of additional content having information that matches the search terms in the search query 110 (e.g., web pages, gadgets, and/or applications related to reality television, barbeque cooking, and/or Chef Emanuel).

For example, the search system 108 can identify a chat program able to connect the user with a chat room filled other people currently watching "Who Knows how to Cook?" The search system 108 can identify the gadget that scans closed captioning text for cooking measurements and displays their converted values. The search system 108 can identify a web page of a restaurant near the user that is owned and operated by Chef Emanuel. The search system 108 sends the list of additional content to the search device 106 in the search results 112. In some implementations, the search system 108 sends links to the additional content, such as a Uniform Resource Identifier (URI). The search device 106 can use the URI information in the search results 112 to request the additional content from the network application data providers 114 that host one or more of the items in the search results 112. In some implementations, the search system 108 sends the additional content without requiring the search device 106 to send a request to retrieve the additional content.

Figure 2:
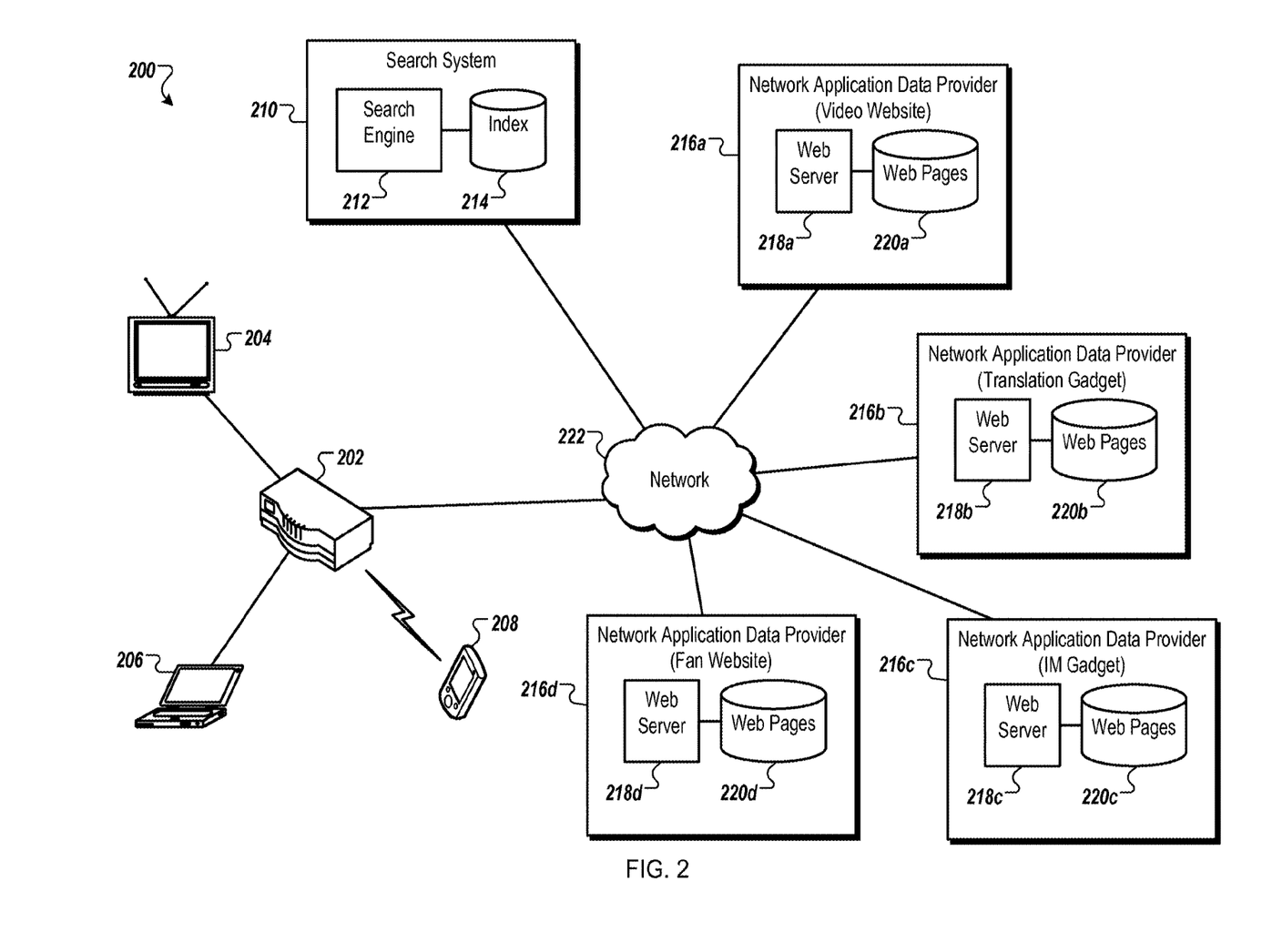
FIG. 2 is a schematic diagram that shows an example of a system for television related searching.

FIG. 2 is a schematic diagram that shows an example of a system 200 for television related searching. The system 200 includes a search device 202 in wire line or wireless communication with a television 204, a personal computer 206, and a wireless video player 208. The television 204, the personal computer 206, and the wireless video player 208 present audio/video data received from the search device 202, including additional content output from a gadget, web page, or application that the search device 202 can overlay on the audio/video data. Other systems including more or fewer video playback devices and similar or different types are also possible. The search device 202 is also in communication with a search system 210 and one or more network application data providers 216a-d over a network 222, such as the Internet.

The search system 210 includes a search engine 212 that processes search queries generated by the search device 202. For example, the search engine 212, or another module or server, may crawl the network 222 to identify content that is available from the network application data providers 216a-d over the network 222. Alternatively, the network application data providers 216a-d or other systems can provide information about available content, such as links to the network application data providers 216a-d. In another example, the network application data providers 216a-d can upload content, such as web pages, video, audio, gadgets, or applications to the search system 210 for download by the search device 202 or the search device 202 can retrieve content directly from the network application data providers 216a-d. In some implementations, the search system 210 provides an app store where applications can be purchased and then downloaded for use by a device, such as the search device 202.

The search system 210 stores information for the content in an index 214. The index 214 can include information such as a name, keywords, a television channel number, a television channel name, a television program name, a time of day, a network address, or other information associated with the content. In some implementations, the index 214 includes a copy of the content allowing the search system 210 to send the content directly to the search device 202.

The network application data providers 216a-d are computing systems that provide access to content over the network 222. The network application data providers 216a-d include respective web servers 218a-d and one or more web pages 220a-d. The web servers 218a-d process incoming and outgoing communications. The web servers 218a-d provide interactivity with the web pages 220a-d. The web pages 220a-d can be shown, for example, in a gadget. While some of the web pages 220a-d may be in a format able to be presented directly by a web browser, such as HTML, some image formats, and JavaScript, other data types may be presented within the browser using plug-ins, such as Java or Flash media.

In one example, the television 204 connected to the search device 202 shows the "Cooking with Sparky" television program. The search device 202 can use information from the search system 210 to identify a translation gadget from the network application data provider 216b. The search device 202 communicates with the web server 218b to request the translation gadget from the web pages 220b.

In another example, the personal computer 206 (e.g., in another room of the same house as the television 204) shows the "Who Knows how to Cook?" television program. The search device 202 can use information from the search system 210 to identify a fan web site from the network application data provider 216d. The search device 202 communicates with the web server 218d to request the fan page for the "Who Knows how to Cook?" television program.

Figure 3:
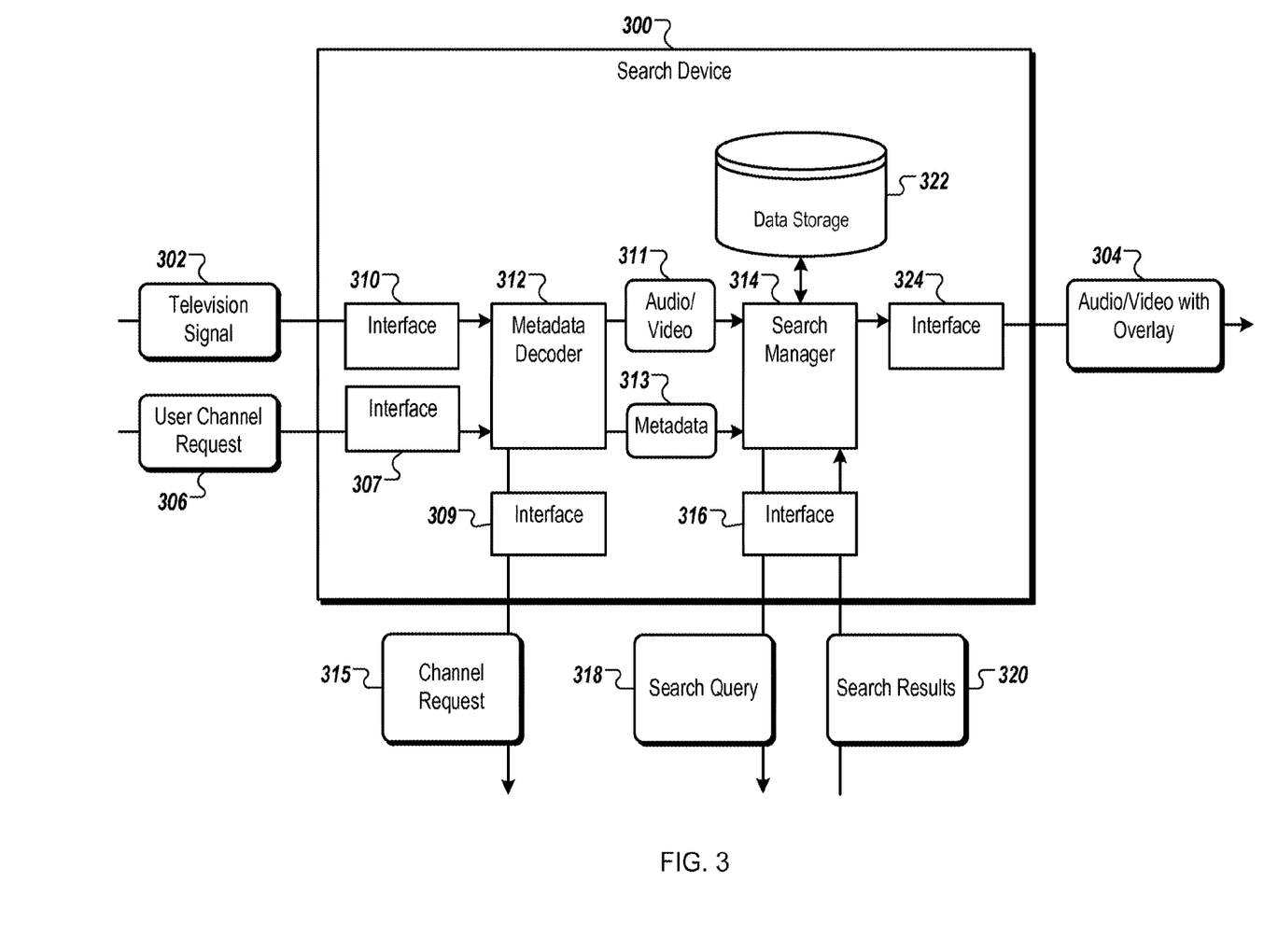
FIG. 3 is a block diagram that shows an example of a search system for television related searching.

FIG. 3 is a block diagram that shows an example of a search device 300 for television related searching. The search device 300 accepts inputs, such as a television signal 302 through an interface 310 and a user channel request 306 through an interface 307. For example, the interface 310 can be a hardware interface such as a consumer electronics video connection. The interface 307 can be a hardware interface, such as a wireless infrared receiver for a remote control, a wire line network connection to a computing device, or a button on the search device 300 itself.

The search device 300 can receive an audio/video signal for a television channel that has already been tuned by a tuner that is external to the search device 300. For example, the search device 300 can receive the user channel request 306 and forward a channel request 315 on to the external tuner through an interface 309. The interface 309 may be a consumer electronics connection, such as an HDMI connection or an IR connection. The search device 300 then receives the television signal 302 from the external tuner for the channel that was requested in the channel request 315. In some implementations, the interface 310 and the interface 309 can be colocated or a single interface, such as in an HDMI connection.

As an alternative to an external tuner, the search device 300 may include a tuner. The search device 300 uses the tuner and the user channel request 306 to tune in an audio and video signal 311 for a particular television channel. For example the search device 300 can include an Advanced Television Systems Committee (ATSC) tuner, a National Television Systems Committee (NTSC) tuner, a Sequential Color with Memory (SECAM) tuner, a Phase Alternating Line (PAL) tuner, and/or a Digital Video Broadcasting (DVB) tuner. The tuner can allow the search device 300 to tune one or more of over the air broadcast television channels, cable television channels, satellite television channels, or channels provided by a telecommunications/telephone company.

In addition to live broadcast by an internal or external tuner, the search device 300 can receive and/or retrieve recorded television programming or video on demand. In addition to video programming, the search device 300 can receive audio channels or radio as the input signal.

The search device 300 includes a metadata decoder 312 that decodes metadata from the television signal 302. For example, the metadata decoder 312 can decode certain metadata 313 from the television signal 302, such as call letters for the television channel, the name of the television program, closed captioning text of the television program, or other metadata included in the television signal 302. The metadata decoder 312 provides the audio and video signal 311 for the television program and the metadata 313 for the television program to a search manager 314. In some implementations, the search manager 314 receives in band metadata if the interface 309 and/or the interface 310 are analog interfaces.

In some implementations, the metadata 313 provided to the search manager 314 is general purpose information that is not specifically designed to be a trigger for additional content. For example, this may allow the search manager 314 to be used with general purpose television programming systems rather than a special purpose television programming provider system specifically designed for presenting additional content.

In some implementations, the search manager 314 can receive out of band metadata through an interface 316. For example, the interface 316 can be a network connection to a local area network or the Internet. The search manager 314 can use, for example, a channel identifier, a time of day and date, and television programming provider head end information (e.g., a name of the provider and/or a location of the search device 300) to access or retrieve EPG data, transcript data, or other out of band programming data related to the television signal 302. In some implementations, the search manager 314 receives out of band metadata through the interface 316 if the interface 309 and/or the interface 310 are digital interfaces.

The search manager 314 generates a search query 318 based on the metadata 313 and/or any out of band metadata. The search manager 314 sends the search query 318 to a remote computing system through the interface 316. In some implementations, the interface 316 can be a network interface to the Internet, an intranet, or other computer network.

The remote computing system processes the search query 318 to identify one or more search results 320. The remote computing system sends the search results 320 to the search manager 314. The search results 320 can include links to additional content, such as a web page, a video available on a web site, a product for sale at an Internet retailer web site, a television program, a television channel, or an application. The items listed in the search results 320 may include items available at the search device 300 or items from a remote system. For example, the search results 320 can include a link to an application that is installed at the search system 300 or a link to an application that can be downloaded from a remote system.

In some implementations, the search manager 314 stores items downloaded from links in the search results 320 in a data storage 322. In some implementations, the data storage 322 is a persistent memory, such as a database in a hard drive or flash memory device. In some implementations, the data storage 322 is a non-persistent memory, such as random access memory (RAM). The search manager 314 can also use the search query 318 to search the data storage 322 for items that have already been downloaded and/or installed at the search device 300.

In some implementations, where the search results 320 include multiple content items, the search manager 314 presents a list of the items to the user and allows the user to select one or more of the items for presentation, download, or recording. In some implementations, the search manager 314 selects a predetermined number of the items resulting from the search (such as the first one, two, or three items) for display and provides an option that allows the user to request that one or more of the non-displayed items be displayed. In some implementations, the search manager 314 selects all of the items resulting from the search for display on the television device. In another example, the search manager 314 selects enough items to fill the space available on the display device and can also provide a user input control to request the display of additional items. In another example, the search manager 314 can hide or disable a gadget or application that has not been used or has been inactive for a threshold amount of time to provide space for other content.

The search manager 314 combines the audio and video signal 311 with content from one or more of the search results 320. For example, the search manager 314 can overlay the audio and visual data from the content on top of the corresponding components of the audio and video signal 311 to produce an audio and video signal with content overlay 304. The search manager 314 outputs the audio and video signal with content overlay 304 through an interface 324 to a device such as the television programming display device 102, the television 204, the personal computer 206, or the wireless video player 208. In some implementations, the interface 324 includes one or more consumer electronics audio/video hardware interfaces, such as High-Definition Multimedia Interface (HDMI), Digital Visual Interface (DVI), component video, composite video, Video Graphics Array (VGA) D-subminiature (DSUB), S/PDIF digital audio (e.g., over coaxial cable or optical fiber, such as TOSLINK), and/or analog audio.

In some implementations, the search manager 314 outputs the audio and video signal with content overlay 304 over a network interface, such as the interface 316. In addition, the search manager 314 can convert the audio and video signal with content overlay 304 to a compressed format, such as the MPEG-2 format or the H.264 format. The search manager 314 can then send the compressed signal to a computing device on the local area network with the search manager 314 or to a remote computing device, such as a device connected to the search manager 314 through the Internet.

Over time the metadata decoder 312 sends updates of the metadata 313 to the search manager 314. For example, if the user inputs a new channel request, the metadata decoder 312 or the interface 307, can pass the new channel identifier to the search manager 314.

In another example, if metadata within the television signal 302 indicates that a previous television program has ended and another television has begun, then the metadata decoder 312 can send the television program status updates to the search manager 314. In another example, the search manager 314 can determine that a television program has ended and a new television program has begun based on the current channel identifier in the metadata 313 and EPG metadata. In some implementations, the search manager 314 retrieves the EPG metadata at runtime from an external source. In some implementations, the search manager 314 retrieves the EPG metadata at some time prior to the search and stores the EPG metadata in a storage device, such as the data storage 322.

In another example, the metadata decoder 312 can send continuous metadata updates to the search manager 314, such as in the case of closed captioning text. As the metadata decoder 312 decodes the closed captioning text from the television signal 302, the metadata decoder 312 sends the closed captioning text to the search manager 314.

The search manager 314 uses the metadata 313 to manage the content currently being displayed in the audio and video signal with content overlay 304. For example, if the user changes the channel, the channel change is reflected in the metadata 313 and the search manager 314 can perform a new search query using the new channel and EPG information associated with the current time and the new channel. In one example, if the search manager 314 is currently displaying a gadget that is no longer included in the new search results, then the search manager 314 can remove the gadget from the audio and video signal with content overlay 304. In some implementations, the search manager 314 prompts the user to accept the removal of the gadget that no longer satisfies the search query.

In some implementations, the search manager 314 publishes data to which the gadgets or applications can subscribe. For example, the search manager 314 can publish the metadata 313 from the metadata decoder 312 or the out of band metadata. In another example, the search manager 314 can publish text or objects recognized from the video in the television signal 302 and/or text recognized from the audio in the television signal 302. In some implementations, the text and/or object recognition of the video or audio can be performed by a remote system. In another implementation, the search manager 314 can perform text and/or object recognition of the video or audio.

A gadget or application can subscribe to a stream including the published data. The gadget or application can then use the published data, such as in translating text into another language. In another example, the search manager 314 can publish other television programming related information, such as an identifier of the channel or television program being presented.

In some implementations, the search manager 314 can publish information related to the user, such as a location of the user (e.g., a city or postal code), television program viewing preferences of the user, or other user information. In some implementations, the search manager 314 only publishes user information upon request by the user. For example, the search manager 314 can prompt the user for confirmation each time a gadget or application requests subscription to user information or other information. In another example, the search manager 314 can apply a confirmation to all gadgets or applications or a group of gadgets and/or applications, such as a group from the same Internet domain or from the same author.

Figure 4:
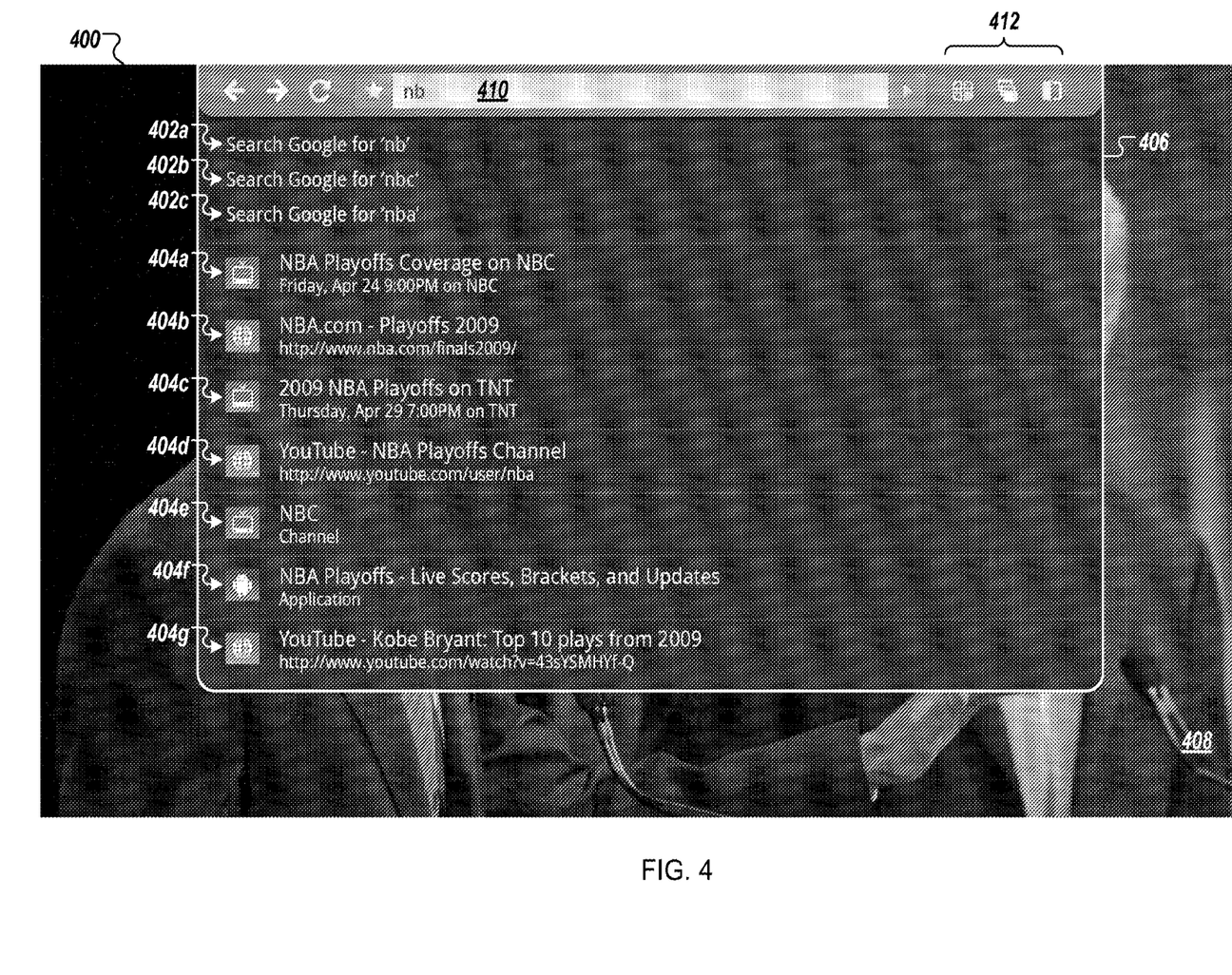
FIG. 4 is an example of a graphical user interface for television related searching.

FIG. 4 is an example of a graphical user interface (GUI) 400 for television related searching. The GUI 400 presents one or more search suggestions 402a-c and one or more search results 404a-g. The search suggestions 402a-c and the search results 404a-g are presented in a window 406 that is overlaid on video for a television program 408. The window includes a search input control 410. A user has entered the text "nb" into the search input control 410. A search device, such as the search device 300, processes the search term "nb" and generates the search suggestions 402a-c. The search device, or a search system in communication with the search device, determines that the user may intend to search for "nb" itself, "nbc," or "nba" and provides these as the search suggestions 402a-c, respectively. The suggestions may be based on, for example, the user's previous searches or popular searches from other users. In addition, the suggestions can include synonyms or terms frequently used in conjunction with the entered term. The search results 404a-g include items that match the query for the search suggestion 402a.

The search results 404a-g include results of performing a search using one or more of the search suggestions 402a-c. For example, the search may be performed using the first suggestion or the suggestion most frequently used by the user or other users. Alternatively, the search may be performed using all of the suggestions or a predetermined number of the suggestions, such as the top two. Where multiple suggestions are used, the corresponding results can be presented separately or intermingled. For intermingled results, the individual results can be processed to remove duplicates and ordered with the more relevant results be listed in a higher position than less relevant results. Relevancy can be based on the number of times the search terms appear in the content for the item and/or the number of times the user or other user have selected the item. Relevancy can also be based on the popularity of the television channel, the popularity of the television program, the quality of the video (e.g., high definition may be ranked higher than standard definition or vice versa), how old an episode of a television program is, or how soon an episode of a television program will be broadcast. For example, the next broadcast of a television program may be ranked higher than subsequent broadcasts or a currently broadcast episode of a television program may be ranked higher than recorded episodes or episodes to be broadcast in the future.

The search results can include multiple types of content. For example, the search result 404e includes a television channel. The search result 404e identifies the name of the channel as "NBC." A user can select the search result 404e to request that the search device tune to that channel. The search results 404a and 404c also include television programs. The television program search results include information identifying the name or title of the program as well as the day and time that the program is or will be broadcast. If a television program listed in the search results is currently being broadcast, a user can select the search result to request that the search device tune to the channel for the search result. If a television program listed in the search results is broadcast in the future, a user can select the search result to request that the search device record the television program. The channel change or recording operation may be preceded by a prompt from the search device for the user to confirm the operation. In some implementations, the search device sends the channel change and/or record command to an external device, such as a DVR or programming provider set-top box.

The search result 404f includes an application. The application provides score and updates for the NBA. If the application is already installed at the search device, the user can select the search result 404f to open the application. Alternatively, if the application is not yet installed at the search device, then the search device can provide a prompt to the user for confirming installation of the applications. In some implementations, the search results only include application results for applications that are already installed at the search device. Once selected, the user interface for the application is presented on the display device with the television programming. In some implementations, the window 406 for the search results is automatically closed upon the user's selection of the application in the search results.

The search results 404b, 404d, and 404g include web pages. The web page search results indicate a title or name for each of the web pages as well as a URL for each of the web pages. A user can select a web page search result to navigate to the selected web page. In some implementations, the window 406 is a browser and the selected web page is displayed in the window 406. The search device can update the search input control 410 to replace the search text with the URL of the displayed web page.

The window 406 includes one or more controls 412 for changing how the additional content is displayed. For example, a user can select a control to split the television programming 408 and the window 406 into left and right halves of the GUI 400. In another example, the GUI 400 can be divided into a larger number of portions, such as four quarters. The television programming 408 can be placed in one quarter while the window 406 can be placed in a second quarter and other content such as web pages or applications can be placed in the other portions of the GUI 400. A user can also select a control to stack or tile the window 406 and windows for other web pages or applications. In another example, the television programming can appear in a thumbnail or overlay while the window 406 or other additional content appears in full screen.

In some implementations, presentation of the search suggestions can be initiated by a request for suggestions from the user rather than a search input from the user. The search device can provide the suggestions based on metadata for the television programming currently being displayed. For example, a user may select an input control requesting additional content for the television programming currently displayed. The search device can use the metadata to generate search suggestions and/or search results. The search device then presents the search suggestions and/or search results in the GUI 400.

In another implementation, presentation of the search suggestions can be triggered by information in the metadata for the television programming being presented to the user. For example, if a television program or commercial mentions or displays a URL for a web page or other data available at a URL, then the search device can initiate a search and/or suggestions for the URL. In some implementations, the suggestions and/or results can be displayed briefly and be removed automatically if the user does not select a suggestion or search result within a certain amount of time. In addition to URLs, the metadata can trigger suggestions or results using other identifying information. For example, a name of a television program or a name or call letters of a television channel can trigger suggestions or search results. A user can then select the television program and/or channel result to display or record that program/channel.

Figure 5:
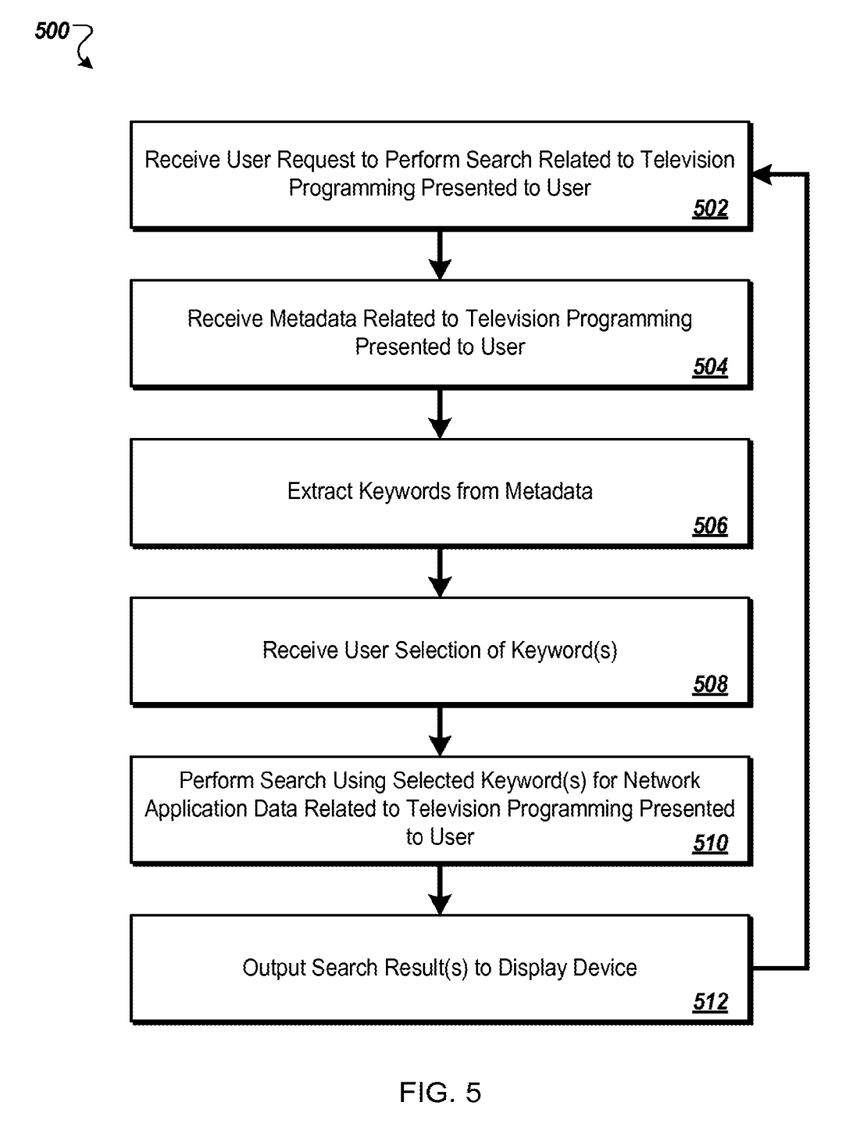
FIG. 5 is a flow chart that shows an example of a process for television related searching.

FIG. 5 is a flow chart that shows an example of a process 500 for television related searching. The processes 500 can be performed, for example, by a system such as the system 100, the system 200, and the search device 300. For clarity of presentation, the description that follows uses the system 100, the system 200, and the search device 300 as examples for describing the process 500. However, another system, or combination of systems, may be used to perform the process 500.

The process 500 receives (502), by for example the search device 202, a user request to perform a search related to television programming being presented to the user. In some examples, this can include a user pressing a button on a remote control, clicking an on screen button, or turning to a new television program. In some implementations, this step can be optional and/or skipped. In some examples, this includes performing the following steps at predetermined time intervals, when a change in television programming is detected, and/or continuously.

The process 500 receives (504), by for example the search system 210, metadata related to the television programming being presented to the user. In some examples, this includes the metadata 304 being received by the metadata decoder 310.

The process 500 extracts (506), by for example the search manager 314, multiple keywords from the metadata. In some examples, this includes identifying an initial list of keywords, which can generate additional keywords to produce search terms that can be more readable. The keywords can be presented to a user as search suggestions.

The process 500 receives (508), by for example the search manager 314, a user selection of at least one of the keywords. In some examples, this includes a user selecting an individual search term or a set of terms in a phrase.

The process 500 performs (510), by for example the search system 210 and/or the search device 202, a search, using the at least one selected keyword, for additional content related to the television programming being presented to the user. In some examples, this includes searching for the search terms in an index of web pages and other content available on the network 222 and ranking the search results based on relevance, date of creation, or other factors.

The process 500 provides (512), by for example the search device 202, results of the search to a client device for presentation to the user. In some examples, this includes overlaying the search results with the television programming being displayed. In other examples, the television programming being displayed can be suspended or reduced to show the search results.

Figure 6:
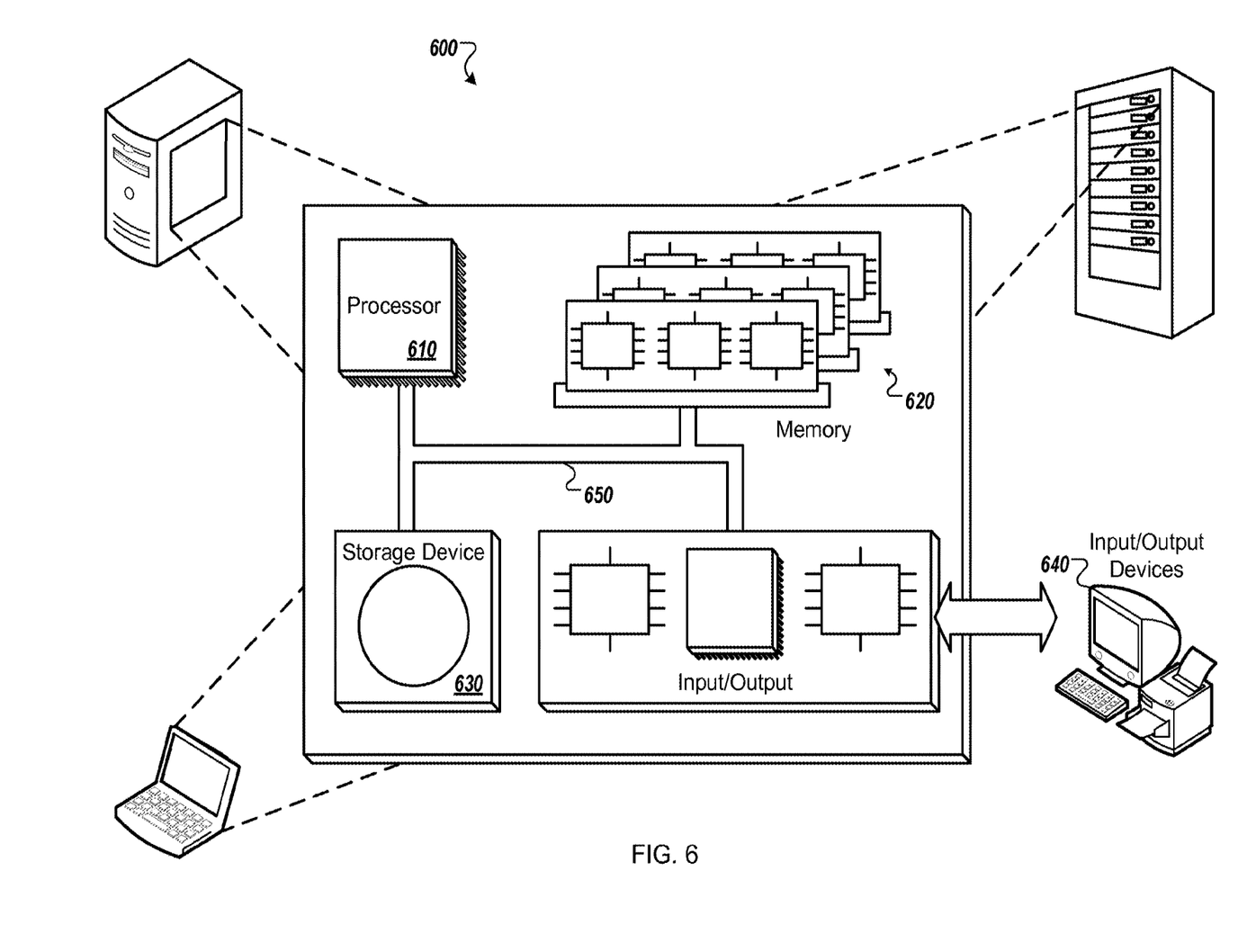
FIG. 6 is a schematic diagram that shows an example of a computing system.

FIG. 6 is a schematic diagram that shows an example of a computing system 600. The computing system 600 can be used for the operations described in association with any of the computer-implement methods and systems described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for television related searching, the computer-implemented method comprising:
receiving a search request related to a media content item being presented on a media device; and
responsive to the search request, causing a first portion of search suggestions and a second portion of search results to be presented on the media device in an overlay that is positioned over the media content item, wherein the second portion of search results includes (i) a first search result that includes a first identifier corresponding to a content item for playback that, in response to receiving a selection of the first identifier, causes the content item to be played back on the media device and (ii) a second search result that is associated with an application content type and includes a second identifier corresponding to an application for execution on the media device that, in response to receiving a selection of the second identifier, causes the application to be launched.

2. The computer-implemented method of claim 1, further comprising detecting that the media content item is being presented on the media device.

3. The computer-implemented method of claim 1, further comprising identifying metadata related to the media content item being presented on the media device.

4. The computer-implemented method of claim 3, further comprising extracting keywords from the metadata, wherein the first portion of search suggestions are generated based on the keywords and based on search results responsive to each search suggestion.

5. The computer-implemented method of claim 1, wherein the search results include a third search result that is associated with a web content type and includes a third identifier corresponding to web content for presentation on the media device.

6. The computer-implemented method of claim 5, wherein the third search result is contemporaneously presented with the first search result and the second search result in the overlay that is positioned over the media content item.

7. The computer-implemented method of claim 5, wherein the third search result includes the third identifier that, in response to receiving a selection of the third identifier, causes the web content corresponding to the third search result to be presented within the overlay in place of the first portion of search suggestions and the second portion of search suggestions that includes the first search result, the second search result, and the third search result.

8. The computer-implemented method of claim 1, further comprising receiving a user selection of the first identifier corresponding to the first search result, wherein the first identifier corresponding to a television program that is scheduled to be broadcast at a future time.

9. The computer-implemented method of claim 8, further comprising, in response to receiving the user selection of the first identifier corresponding to the first search result, causing content corresponding to the first identifier to be recorded at the future time by transmitting a record command to the media device.

10. The computer-implemented method of claim 1, wherein additional search suggestions are generated in response to determining that a television programming change has occurred.

11. The computer-implemented method of claim 10, wherein the television programming change includes a change from a first source to a second source.

12. The computer-implemented method of claim 10, wherein the television programming change includes a change from the media content item to a different media content item.

13. The computer-implemented method of claim 10, wherein the television programming change includes a change within the media content item.

14. The computer-implemented method of claim 1, further comprising generating search suggestions based on search terms inputted into a search input region, wherein the search results are responsive to at least a portion of the search suggestions.

15. The computer-implemented method of claim 14, further comprising performing a search that inputs each of a predetermined number of the search suggestions to a search engine system, wherein the search results are ranked in the overlay based on relevancy.

16. The computer-implemented method of claim 1, further comprising, in response to receiving a selection of the second identifier, determining whether the application has been installed.

17. The computer-implemented method of claim 16, wherein, in response to determining that the application has been installed, causing the application to be launched while causing the overlay to be removed.

18. The computer-implemented method of claim 16, wherein, in response to determining that the application has not been installed, causing a prompt to install the application to be presented and causing the overlay to be removed and the application to be launched in response to determining that the application has been installed.

19. A system for television related searching, the system comprising:
a hardware processor that:
receives a search request related to a media content item being presented on a media device; and
responsive to the search request, causes a first portion of search suggestions and a second portion of search results to be presented on the media device in an overlay that is positioned over the media content item, wherein the second portion of search results includes (i) a first search result that includes a first identifier corresponding to a content item for playback that, in response to receiving a selection of the first identifier, causes the content item to be played back on the media device and (ii) a second search result that is associated with an application content type and includes a second identifier corresponding to an application for execution on the media device that, in response to receiving a selection of the second identifier, causes the application to be launched.

20. A non-transitory computer-readable medium containing computer executable instructions that, when executed by a processor, cause the processor to perform a method for television related searching, the method comprising:
receiving a search request related to a media content item being presented on a media device; and
responsive to the search request, causing a first portion of search suggestions and a second portion of search results to be presented on the media device in an overlay that is positioned over the media content item, wherein the second portion of search results includes (i) a first search result that includes a first identifier corresponding to a content item for playback that, in response to receiving a selection of the first identifier, causes the content item to be played back on the media device and (ii) a second search result that is associated with an application content type and includes a second identifier corresponding to an application for execution on the media device that, in response to receiving a selection of the second identifier, causes the application to be launched.

\* \* \* \* \*